(12) United States Patent
Hayashi et al.

(10) Patent No.: US 6,588,780 B2
(45) Date of Patent: Jul. 8, 2003

(54) UPPER SUPPORT IN VEHICLE SUSPENSION SYSTEMS

(75) Inventors: Yukio Hayashi, Kasugai (JP); Kohichi Kobayashi, Ichinomiya (JP)

(73) Assignee: Tokai Rubber Industries, Ltd. (JP)

( * ) Notice: Subject to any disclaimer, the term of this patent is extended or adjusted under 35 U.S.C. 154(b) by 9 days.

(21) Appl. No.: 09/818,184

(22) Filed: Mar. 27, 2001

(65) Prior Publication Data

US 2001/0026057 A1 Oct. 4, 2001

(30) Foreign Application Priority Data

Mar. 29, 2000 (JP) ........................................ 2000-090178

(51) Int. Cl.$^7$ .............................. B60G 15/04; F16F 7/00
(52) U.S. Cl. ........................ 280/124.147; 280/124.155; 267/220
(58) Field of Search ................... 280/124.155, 124.147; 267/220; 188/321.11

(56) References Cited

U.S. PATENT DOCUMENTS

| | | | | |
|---|---|---|---|---|
| 4,465,296 A | * | 8/1984 | Shiratori et al. | 267/220 |
| 4,798,370 A | * | 1/1989 | Inuzuka | 267/220 |
| 4,877,262 A | * | 10/1989 | Tanahashi et al. | 280/124.155 |
| 5,040,775 A | * | 8/1991 | Miyakawa | 267/140.13 |
| 5,308,048 A | * | 5/1994 | Weaver et al. | 267/141.1 |
| 5,308,104 A | * | 5/1994 | Charles | 267/220 |
| 5,342,029 A | * | 8/1994 | Carter | 188/321.11 |
| 5,664,650 A | * | 9/1997 | Kammel et al. | 188/321.11 |
| 5,947,455 A | * | 9/1999 | Mikasa et al. | 267/140.13 |
| 6,161,822 A | * | 12/2000 | Hurst et al. | 188/321.11 |
| 6,260,836 B1 | * | 7/2001 | Aoyama et al. | 267/179 |

FOREIGN PATENT DOCUMENTS

| | | | | |
|---|---|---|---|---|
| JP | 62178410 A | * | 8/1987 | ........... B60G/13/06 |
| JP | 09004673 A | * | 1/1997 | ............. F16F/9/54 |
| JP | 11-94007 | | 4/1999 | |

* cited by examiner

Primary Examiner—Paul N. Dickson
Assistant Examiner—Laura B. Rosenberg
(74) Attorney, Agent, or Firm—Rossi & Associates

(57) ABSTRACT

An upper support for a wheel suspension system of a vehicle having a shock absorber, which comprises an inner member connected to a piston rod of the shock absorber, an outer sleeve member disposed radially outwardly of the inner member and fixed to the vehicle body, and an elastic body interposed between the inner and outer sleeve members. The outer member has an upper and lower stop portions formed at axially opposite open-end portions thereof, so as to extend radially inwardly. The elastic body is bonded at its inner circumferential surface to the outer circumferential surface of the inner member, and is held in close contact at its outer circumferential surface with the inner circumferential surface of the outer sleeve member, while being held in abutting contact at its axially opposite end faces with the upper and lower stop portions of the outer sleeve. The upper support further includes an upper and lower elastic protrusions which protrude axially upwardly and downwardly from the inner member, and which is brought into abutting contact with the upper and lower stop portions. The elastic body is compressed by the outer sleeve member in the radial direction so that the elastic body exhibits a shear strain of not greater than 1, upon application of an axial load of 1000N between the inner and the outer sleeve members in a bound direction.

9 Claims, 3 Drawing Sheets

FIG.6

UPPER SUPPORT IN VEHICLE SUSPENSION SYSTEMS

INCORPORATION BY REFERENCE

The disclosure of Japanese Patent Application No. 2000-090178 filed on Mar. 29, 2000 including the specification, drawings and abstract is incorporated herein by reference in its entirety.

BACKGROUND OF THE INVENTION

1. Field of the Invention

The present invention relates generally to an upper support used in a vehicle suspension system for supporting a piston rod of a shock absorber to a body of the vehicle, in a vibration-damping manner, and more particularly, to an upper support which is usable in a so-called "input separation type" suspension system, wherein the upper support elastically support the piston rod of the shock absorber to the body of the vehicle, independently of a suspension spring of the suspension system.

2. Description of the Related Art

A wheel suspension assembly for an automotive vehicle includes a suspension spring and a shock absorber. The suspension assembly is interposed between a suspension arm or other members connected to a wheel of the vehicle and a body of the vehicle, for pivotally supporting the suspension arm to the vehicle body in a vibration-damping manner. In general, the shock absorber is secured at one end of its piston rod to a part of the vehicle body via a suspension upper support, for reducing or attenuating vibrations transmitted through the shock absorber into the vehicle body.

A known example of the above type of upper support is disclosed in Japanese Patent Laid-Open Publication No. JP-A-11-94007. The disclosed upper support includes: an inner member made of metal; an outer sleeve made of metal and disposed outwardly of the inner member in a radial direction perpendicular to an axial direction of the inner member with a predetermined spacing therebetween; and an rubber elastic body interposed between the inner member and the outer sleeve for elastically connecting therebetween. The outer sleeve has an upper and a lower stopper portions formed at its axially opposite open end portions, respectively, so as to protrude radially inward direction. The disclosed upper support further includes an upper and a lower elastic protrusions which protrude axially outwardly from the inner member in opposite axial directions so that the upper and lower elastic protrusions are held in abutting contact with the upper and lower stopper portions of the outer sleeve, respectively. The upper support constructed as described above is fixed at its inner member to the piston rod of the shock absorber, and is fixed at its outer sleeve to the vehicle body, for thereby elastically supporting the piston rod of the shock absorber with respect to the vehicle body.

However, the disclosed upper support with such conventional structure has a problem that it is likely to generate unusual sound or noise due to sliding or abutting contacts of the rubber elastic body with the outer sleeve member, upon application of high vibrational loads to the upper support in the axial, radial, inclined, torsional and other directions.

As a method to cope with the problem, it has been proposed in the above-indicated publication a modified structure of the upper support in which the rubber elastic body is bonded at its outer surface to the outer sleeve. However, this upper support with the modified structure requires a specific manufacturing step, e.g., an application of the adhesives to the outer sleeve, upon manufacturing thereof, thereby lowering the production efficiency of the upper support, and thereby increasing the cost of manufacture of the upper support. Further, the upper support with the modified structure may possible suffer from deterioration in its noise control effect, due to possible variations in bonding strength between the rubber elastic body and the outer sleeve. The variations of the bonding strength may cause partial debonding or separation of the rubber elastic body from the outer sleeve, upon application of an excessively large load to the upper support, or due to the aging of the upper support.

SUMMARY OF THE INVENTION

It is therefore an object of the present invention to provide an upper support for a vehicle suspension system, which is preferably applicable to an input-separation type suspension system, and which has a novel and simple structure for eliminating or reducing noises generated upon application of a load thereto.

The above and other objects of this invention may be attained according to the following modes of the invention. Each of these modes of the invention is numbered like the appended claims and depends from the other mode or modes, where appropriate, to indicate possible combinations of elements or technical features of the invention. It is to be understood that the principle of the invention is not limited to those modes of the invention and combinations of the technical features, but may otherwise be recognized based on the thought of the present invention that disclosed in the whole specification and drawings or that may be recognized by those skilled in the art in the light of the disclosure in the whole specification and drawings.

(1) An upper support for a suspension system, which is interposed between a body of a vehicle and a shock absorber of the vehicle for elastically supporting the shock absorber with respect to the body independently of a suspension spring of the suspension system, the upper support including: (a) an inner member connectable to a piston rod of the shock absorber; (b) an outer sleeve member which is disposed outwardly of the inner member in a radial direction perpendicular to an axial direction of the inner member with a spacing therebetween, and which is connectable to the body of the vehicle, the outer sleeve member having a first and a second stop portion formed at respective axially opposite open end portions thereof so as to protrude radially inwardly; (c) an elastic body interposed between an outer circumferential surface of the inner member and an inner circumferential surface of the outer sleeve member which is opposed to the outer circumferential surface of the inner member in the radial direction, the elastic body being secured at an inner circumferential surface thereof to the outer circumferential surface of the inner member, while being closely contact at an outer circumferential surface thereof with the inner circumferential surface of the outer sleeve member, the elastic body being held in abutting contact at axially opposite end faces thereof with the first and second stop portions of the outer sleeve member, respectively; and (d) a first and a second elastic protrusion protruding outwardly from the inner member in opposite axial directions, the first and second elastic protrusions being brought into abutting contact with the first and second stop portions of the outer sleeve member, respectively. The elastic body is compressed by the outer sleeve member in the radial direction so that the elastic body exhibits a shear strain of not greater than 1, upon application of an axial load of 1000N between the inner member and the outer sleeve member in a primary load receiving direction.

In the upper support constructed according to the present invention, the elastic body is subjected to a preload in the radial direction, namely the elastic body is previously compressed in the radial direction by a radial compression force having a value not smaller than a predetermined level. This arrangement makes it possible to decrease or minimize an amount of strain or deformation of the elastic body upon application of loads to the upper support. This arrangement also permits an increase of a frictional resistance at an interface formed between the outer circumferential surface of the elastic body and the inner circumferential surface of the outer sleeve, thereby preventing or minimizing a relative displacement between the elastic body and the outer sleeve at the interface. Therefore, the upper support of this invention is capable of minimizing uncomfortable sounds or noises caused by the relative displacement of the elastic body and the outer sleeve at the interface, upon application of the loads to the upper support.

In particular, the elastic body is subjected to the radial compression force under the specific condition, namely, with the axially opposite end faces of the elastic body held in abutting contact with the first and second stopper of the outer sleeve, respectively, for thereby limiting a free displacement of the elastic body in the opposite axially outward directions. This ensures a stable application of the radial preload to the elastic body with efficiency, whereby the upper support can exhibit a desired noise preventing effect with high stability.

It is noted that the shear strain "ϵ" of the elastic body is represented by the following formula (1):

$$\epsilon = (\sqrt{(B^2+\delta^2)})/b \qquad (1)$$

where,
b=radial length of elastic body which is measured with no radial load applied to the elastic body (i.e., radial distance between outer circumferential surface of the inner member and the outer circumferential surface of the elastic body)
B=radial length of elastic body which is measured with radial load applied to the elastic body
δ=actual amount of axial displacement of the inner member relative to the outer sleeve upon application of 1000N load to the upper support in a bound direction as a primary load receiving direction.

According to one advantageous arrangement of this mode (1), the elastic body may be arranged to exhibit the shear strain of not grater than 1, upon application of a 1000N load in a rebound direction, thereby eliminating or minimizing the noises upon application of the rebound load to the upper support.

In this mode (1), the configurations and structures of the inner member and the outer sleeve are not particularly limited. According to another advantageous arrangement of this mode (1), the outer circumferential surface of the inner member and the inner circumferential surface of the outer member comprise respective cylindrical surfaces which are opposed to each other in the radial direction, and which are elastically connected with each other by the elastic body interposed therebetween. According to yet another advantageous arrangement of this mode (1), the inner member includes an annular connecting portion extending in the radial direction perpendicular to the axial direction thereof, the annular connecting portion being opposed at an outer circumferential surface thereof to the inner circumferential surface of the outer sleeve in the radial direction, while being opposed at axially opposite first and second end faces thereof to the first and second stop portions thereof, respectively, in the axial direction of the inner member, the first elastic protrusion being disposed between the first stop portion and the first end face of the annular connecting portion, while the second elastic protrusion being disposed between the second stop portion and the second end face of the annular connecting portion. In still another advantageous arrangement of this mode (1), the outer sleeve member is constituted by an hollow cylindrical metallic member having the first stop portion integrally formed at one of axially opposite open end portions so as to extend radially inwardly, the inner member and the elastic body fixed to the outer circumferential surface of the inner member is inserted from the other open end portion of the outer sleeve member and fitted into the outer sleeve member, and then an annular disk shaped metallic member is superposed on and fixed to the other open end portion of the outer sleeve to thereby form the second stop portion. Preferably, the annular disk shaped metallic member and the other open-end portion of the outer sleeve member may have respective fixing plates in the form of outward flanges as integral parts. These fixing plates of the metallic member and the outer sleeve member are superposed on each other and serve as a fixing portion of the outer sleeve member at which the outer sleeve member firmly fixed to the vehicle body.

Alternatively, in a still further advantageous arrangement of this mode (1), the outer sleeve is a split structure consisting of a pair of cylindrical metallic members each having the first or second stop portion integrally formed at one of axially opposite open end portions thereof so as to extend in a radially inward direction, the pair of cylindrical metallic members are press-fitted onto respective axially opposite end portions of the elastic body, and are butted together at the other axially opposite open end portions thereof in the axial direction. Preferably, each of the pair of the cylindrical metallic members has a fixing plate in the form of outward flange, which is integrally formed at the other axially opposite open-end portion thereof, which is remote from the corresponding stop portions. The fixing plates of the pair of cylindrical metallic members are superposed on each other in the axial direction and serve as a fixing portion of the outer sleeve member at which the outer sleeve is firmly fixed to the vehicle body.

In this mode (1) of the present invention, the first and second elastic protrusions may be spaced apart from the respective first and second stop portions in the axial direction, when the upper support is not subjected to an axial load. Alternatively, the first and second elastic protrusions are held in pressing contact with the first and second stop portions of the outer sleeve, in a static state of the upper support. In the latter case, the upper support permits an elimination of an impact noise generated by collision of the first and second elastic protrusions to the respective first and second stop portions upon application of the axial vibrational load to the upper support.

Various methods and structures may be employable in order to apply the radial compression force to the elastic body. For instance, the outer sleeve may be radially inwardly drawn onto the elastic body disposed radially inwardly of the outer sleeve, whereby the elastic body is compressed in the radial direction.

(2) An upper support according to the above mode (1), wherein the elastic body is forcedly pressed into the outer sleeve member, whereby the elastic body is compressed by the outer sleeve member in the radial direction. In this mode (2) of the present invention, a desired radial compression force is applied to the elastic body with ease and prompt.

According to one advantageous arrangement of this mode (2), the outer circumferential surface of the elastic body and the inner circumferential surface of the outer sleeve member are tapered so as to have respective diameters which decrease in a pressing direction in which the elastic body is pressed into the outer sleeve member. This arrangement facilitates not only manufacture but also assembly of the elastic body and the outer sleeve.

(3) An upper support according to the above mode (1) or (2), wherein the elastic body is subjected to an axial compression force applied to the axially opposite end faces thereof by the outer sleeve. In the present mode (3), a suitable compressive preload is applied to the elastic body in the axial direction as well as the radial direction, whereby the radial compression force is effectively applied to the elastic body by the outer sleeve member, resulting in an improved noise preventing or reducing effects of the upper support.

(4) An upper support according to any one of the above modes (1)–(3), the upper support further comprising: a first annular groove disposed between an abutting portion of the elastic body to the first stop portion and an abutting portion of the first elastic protrusion to the first stop portion, said first annular groove being open to the axially outward direction and continuously extending in the circumferential direction; and a second annular groove disposed between an abutting portion of the elastic body to the second stop portion and an abutting portion of the second elastic protrusion to the second stop portion, said second annular groove being open to the axially outward direction and continuously extending in the circumferential direction, the abutting portions of the elastic body and the first elastic protrusion with respect to the first stop portion being substantially independent of each other by the first groove disposed therebetween, and the abutting portions of the elastic body and the second elastic protrusion with respect to the second stop portion being substantially independent of each other by the second groove disposed therebetween.

The arrangement of this mode (4) is effective to avoid or reduce an adverse affect of the radial and axial compression forces applied to the elastic body on the first and second elastic protrusions, ensuring desired vibration absorbing or buffering effects of the first and second elastic protrusions. The provision of the first and second annular grooves permits the upper support to exhibit non-linear spring characteristics with ease. The provision of the first and second annular grooves is also effective to reduce an amount of transmission of axial loads applied between the inner member and the outer sleeve to the first and second elastic protrusions, thereby effectively preventing or reducing a relative displacement between abutting surfaces of the first and second elastic protrusions and the first and second stop portions, leading to effective prevention of the noises generated by impacts of the abutting surfaces of the first and second elastic protrusions to the first and second stop portions, respectively.

BRIEF DESCRIPTION OF THE DRAWINGS

The above and other objects, features advantages and technical and industrial significance of the present invention will be better understood by reading the following detailed description of the presently preferred embodiments or modes of the invention when considered in connection with the accompanying drawings in which.

DETAILED DESCRIPTION OF THE PREFERRED EMBODIMENT

Figure 1:
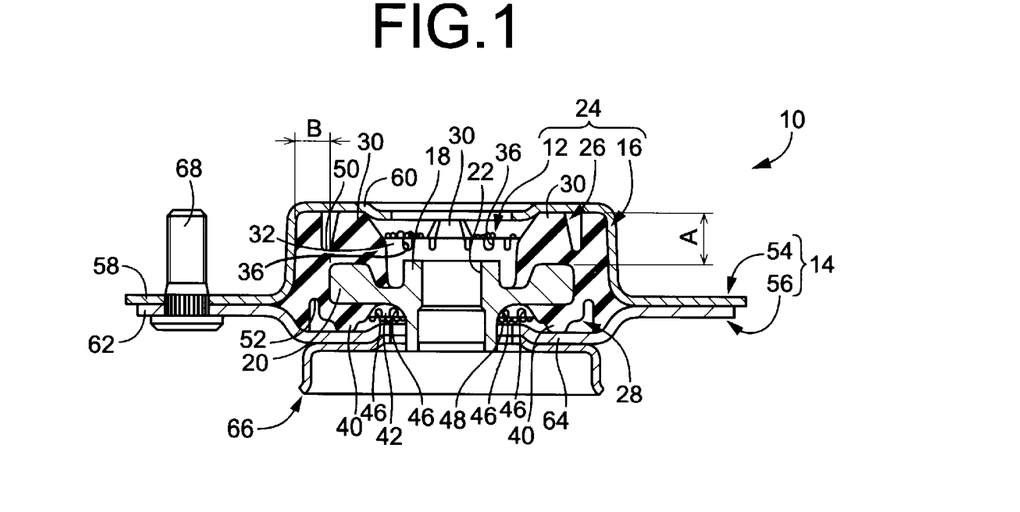
FIG. 1 is an elevational view in axial cross section of one embodiment of the present invention, in the form of an upper support used for a suspension system of an automotive vehicle, taken along line 1—1 of FIG. 2.
Figure 2:
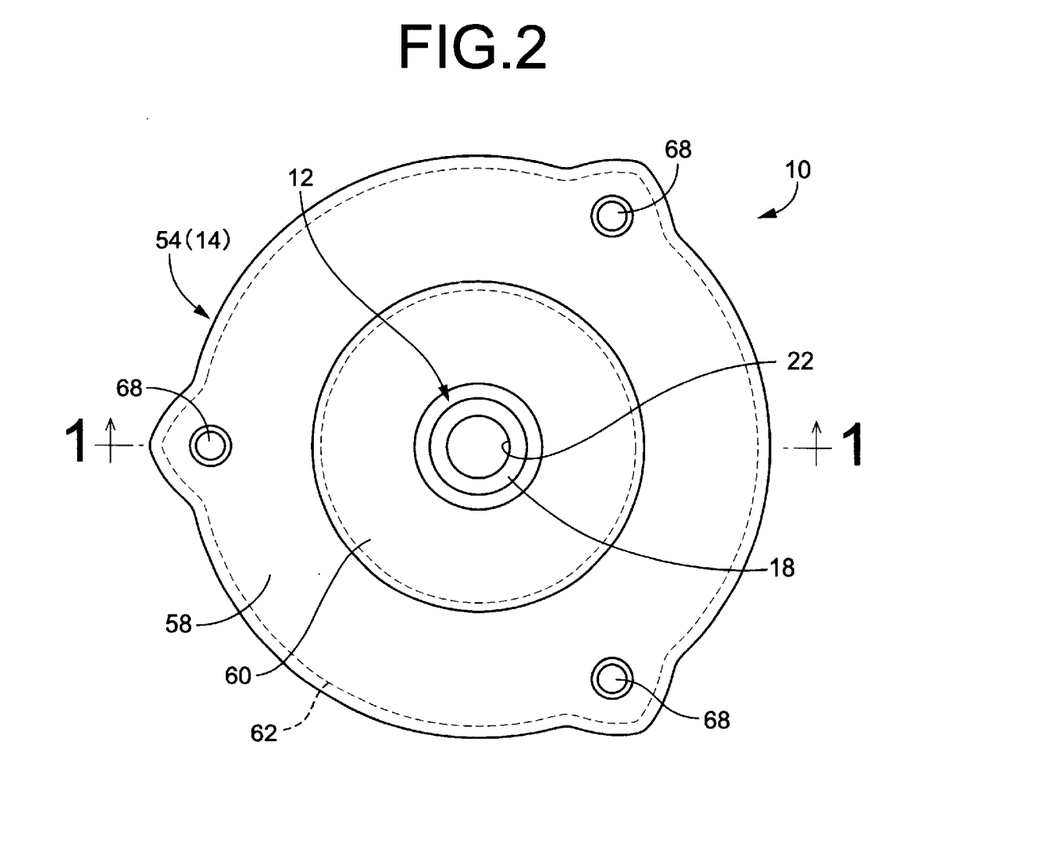
FIG. 2 is a top plane view of the upper support of FIG. 1.

Referring first to FIGS. 1 and 2, there is shown an upper support 10 used for a so-called "input-separation type" suspension system of an automotive vehicle, which is constructed according to a first embodiment of the present invention. The upper support 10 includes an inner member 12 made of metal and an outer sleeve member 14 made of metal and disposed outwardly of the inner member 12 with a predetermined spacing therebetween in a radial direction perpendicular to the axial direction of the inner member 12. The upper support 10 further includes an elastic body 16 interposed between the inner member 12 and outer sleeve member 14 for elastically connecting these members 12, 14. The inner member 12 is fixed to a piston rod of a shock absorber (not shown) of the suspension system, while the outer sleeve member 14 is fixed to a body (not shown) of the vehicle, whereby the upper support 10 supports the shock absorber with respect to the vehicle body in a vibration damping fashion. In the following description, the words "upper" and "lower" or "upward" and "downward" will be used to represent vertically upper and lower positions of the components or parts of the upper support 10 as viewed in FIG. 1. In FIGS. 1 and 3, the elastic body 16 is illustrated only in its cross section.

Described in detail, the inner member 12 is a generally annular disk-shaped member. The inner member 12 has a cylindrical fixing plate 18 integrally formed at its inner peripheral portion and extending in the axially opposite directions from the inner peripheral portion, and an annular connecting portion in the form of an annular thick-walled portion 20 integrally formed at its outer peripheral portion and extending in the axially upward direction as viewed in FIG. 1. The inner member 12 constructed as described above is secured to the shock absorber (not shown) such that the upper end portion of the piston rod of the shock absorber is inserted through a bore 22 of the fixing plate 18 and fastened thereto by a bolt or other fastening members. In this condition, the inner member 12 and the piston rod are held in a substantially concentric or coaxial relationship with each other.

Figure 3:
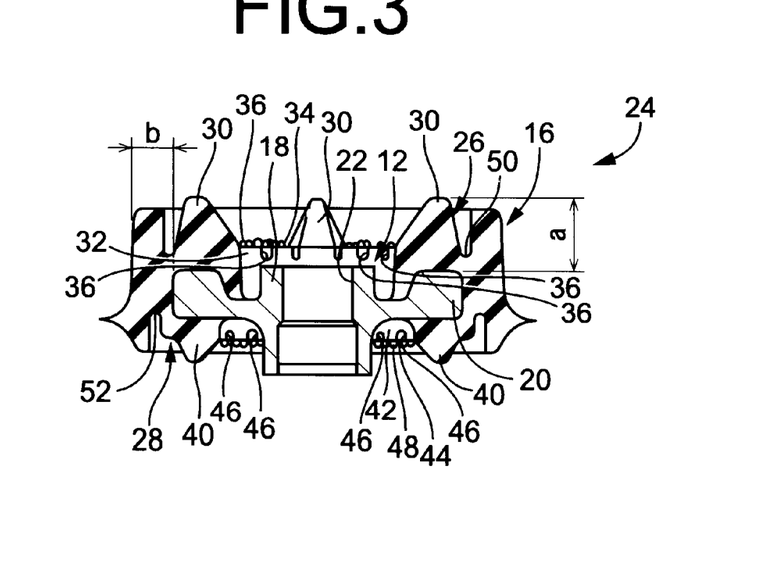
FIG. 3 is an elevational view in axial cross section of an integrally vulcanized product of the upper support of FIG. 1, taken along line 3—3 of FIG. 4.
Figure 4:
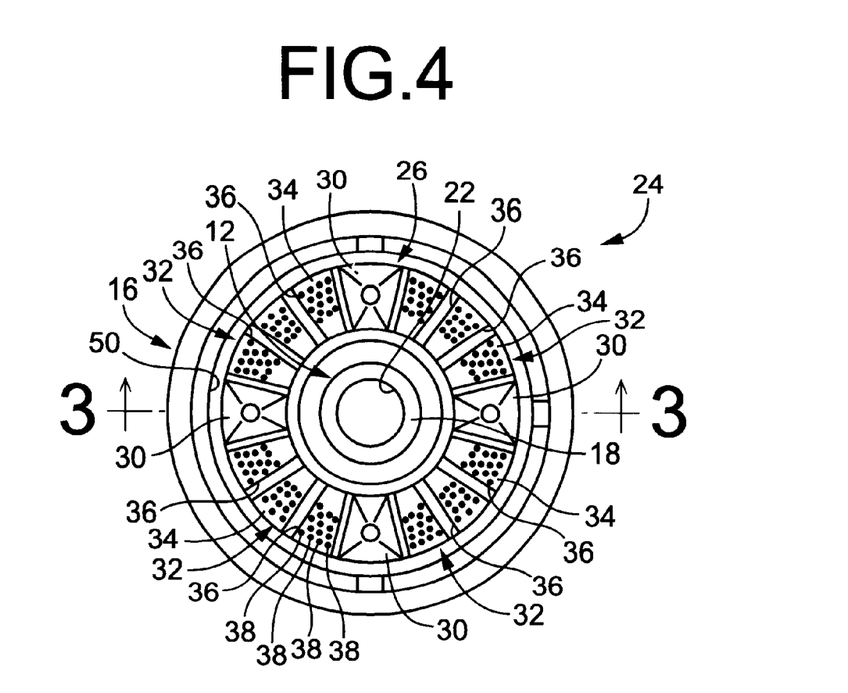
FIG. 4 is a top plane view of the integrally vulcanized intermediate product of FIG. 3.
Figure 5:
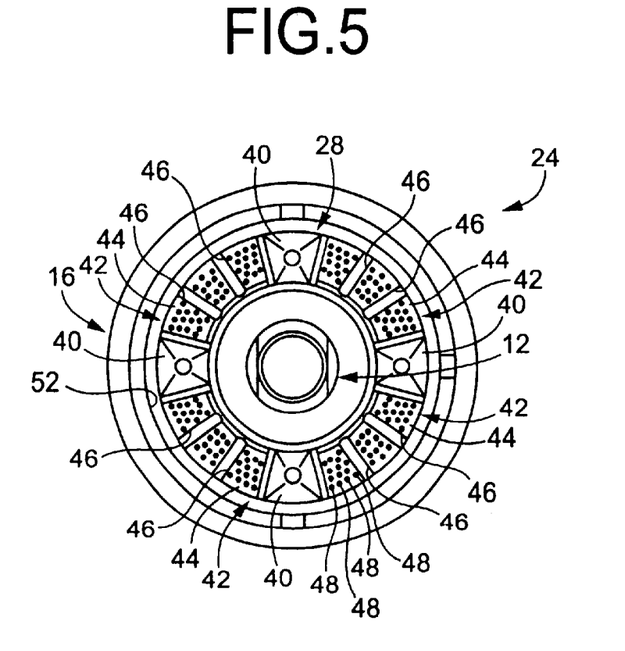
FIG. 5 is a bottom plane view of the integrally vulcanized intermediate product of FIG. 3.

The elastic body 16 is bonded to the outer circumferential portion of the inner member 12 upon vulcanization of a rubber material for forming the elastic body 16, to thereby provide an integrally vulcanized product 24 as shown in FIGS. 3–5. The elastic body 16 has a generally cylindrical or annular block shape with a large diameter, and is disposed radially outwardly of the inner member 12, while protruding axially outwardly from the inner member 12 by a given axial distance in the opposite axial directions.

A first and a second elastic protrusion in the form of an upper and a lower elastic protrusions 26, 28 are integrally formed with an inner circumferential portion of the elastic body 16. The upper elastic protrusion 26 has a generally annular shape and is bonded to and covers over the axially upper surface of the outer circumferential portion of the inner member 12, upon vulcanization of a rubber material for forming the upper elastic protrusion 26. The upper elastic protrusion 26 has integrally formed four elastic projections 30 each having a shape of a generally quadrangular pyramid or a cone. The four elastic projections 30 are integrally formed on respective circumferential portions of the upper elastic protrusion 26, which portions are equally spaced apart from each other in the circumferential direction of the upper elastic protrusion 26, and protrude axially outwardly from the upper elastic protrusion 26 by a given axial distance. The upper elastic protrusion 26 further has integrally formed four elastic blocks 32 each of which is interposed between adjacent ones of the elastic projections 30 in the circumferential direction of the upper elastic protrusion 26. Each of the four elastic blocks 32 has an arcuate trapezoid shape and protrudes axially outwardly from the upper elastic protrusion 26. The each elastic block 32 is separated apart from the adjacent elastic projections 30 in the circumferential direction and is substantially deformable independent of the elastic projections 30.

The each elastic block 32 includes two radial grooves 36 which are open in a protruding end face 34 thereof and are spaced apart from each other in the circumferential direction with a given circumferential spacing therebetween. The radial grooves 36 are formed with a width which is made smaller than the axial length of the elastic block 32 so that only the protruding end portion of the elastic block 32 is divided into three parts by the radial grooves 36. Each of the radial grooves 36 has a generally semi-circular cross section. The protruding end face 34 has a multiplicity of elastic tiny bosses 38 as integral parts which are formed over the entire area of the protruding end face 34, except local areas where the radial grooves 36 are formed. Each of the elastic tiny bosses 38 has a tapered shape such as a hemispheric shape, preferably.

On the other hand, the lower elastic protrusion 28 has a generally annular overall configuration, and is bonded to and covers over the axially lower surface of the outer circumferential portion of the inner member 12, upon vulcanization of a rubber material for forming the lower elastic protrusion 28. The lower elastic protrusion 28 has integrally formed four elastic projections 40 each having a shape of a quadrangular pyramid or a cone. The four elastic projections 40 are integrally formed on respective circumferential portions of the lower elastic protrusion 28, which portions are equally spaced apart from each other in the circumferential direction of the lower elastic protrusion 28, and protrude axially outwardly from the lower elastic projection 28 by a given axial distance. The lower elastic protrusion 28 further has integrally formed four elastic blocks 42 each of which is interposed between corresponding adjacent ones of the elastic projections 40 in the circumferential direction of the lower elastic protrusion 28. Each of the four elastic blocks 42 has an arcuate trapezoid shape and protrudes axially outwardly from the lower elastic protrusion 28. The each elastic block 42 has a substantially constant axial length which is smaller than that of the elastic body 16. The each elastic block 42 is separated from the adjacent elastic projections 40 in the circumferential direction and is substantially deformable independent of the elastic projections 40.

The each elastic block 42 includes two radial grooves 46 which are open in a protruding end face 44 thereof and are spaced apart from each other in the circumferential direction with a given circumferential spacing therebetween. The radial grooves 46 are formed with a width which is made smaller than the axial length of the elastic block 42 so that only the protruding end portion of the elastic block 42 is divided into three parts by the grooves 46. Each of the radial grooves 46 has a generally semi-circular cross section. The protruding end face 44 has a multiplicity of elastic tiny bosses 48 as integral parts which are formed over the entire area of the protruding end face 44, except local areas where the grooves 46 are formed. Each of the elastic tiny bosses 48 has a tapered shape such as a hemispheric shape, preferably.

The elastic body 16 is integrally bonded at an axially intermediate portion of the inner circumferential surface thereof to the outer circumferential surfaces of the upper and lower elastic protrusions 26, 28, and the outer circumferential surface of the inner member 12, in the above-indicated vulcanization of the rubber material for the elastic body 16. Between the elastic body 16 and the upper elastic protrusion 26, there is formed a first annular groove in the form of an upper annular groove 50 open in the axially upper end face of the elastic body 16 and extending continuously in the circumferential direction. Likewise, between the elastic body 16 and the lower elastic protrusion 28, there is formed a second annular groove in the form of an lower annular groove 52 which open in the axially lower end face of the elastic body 16 and extending continuously in the circumferential direction. In the provision of the upper and lower groove 50, 52, the elastic body 16 is substantially separated from the upper and lower elastic protrusions 26, 28.

The integrally vulcanized product 24 consisting of the inner member 12, the elastic body 16 and the upper and lower elastic protrusions 26, 28 as described above, is assembled within the outer sleeve member 14. The outer sleeve member 14, as shown in FIGS. 1 and 2, has a split structure consisting of a large-diameter upper cylindrical member 54 and a large-diameter lower cylindrical member 56, which are both made of metal. The upper cylindrical member 54 has an annular disk-shaped outward flange 58 which has a large diameter and which is integrally formed at axially lower end peripheral portion of the upper cylindrical member 54 so as to extend radially outward direction. The upper cylindrical member 54 also has a first stop portion in the form of an annular disk-shaped upper stopper plate 60 which is integrally formed at axially upper end peripheral portion of the upper cylindrical member 54 so as to extend radially inward direction. On the other hand, the lower cylindrical member 56 has an annular disk-shaped outward flange 62 which has a large diameter and which is integrally formed at axially upper end peripheral portion of the lower cylindrical member 56, as viewed in FIG. 1. The lower cylindrical member 56 also has a second stop portion in the form of an lower stopper plate 64 which is integrally formed at axially lower end peripheral portion of the lower cylindrical member 56 so as to extend radially inwardly.

The upper and lower cylindrical members 54, 56 are inserted from and onto the axially upper and lower end portions of the integrally vulcanized product 24, and are fixed together with their outward flanges 58, 62 in abutment on each other. In this condition, the upper and lower cylindrical members 54, 56 are held in a substantially coaxial relationship with each other, and are fixed together with the integrally vulcanized product 24 interposed therebetween. With the outer sleeve member 14 assembled with the integrally vulcanized product 24 as described above, inner circumferential surfaces of the upper and lower cylindrical members 54, 56 are held in close contact with the outer circumferential surface of the elastic body 16. The outer sleeve member 14 further includes a metallic support member 66 welded to the lower stopper plate 64. The metallic support member 66 extends axially outward (i.e., downwardly as viewed in FIG. 1) from the lower stopper plate 64 with a generally cylindrical shape, and is connected with a bump stopper (not shown) of the vehicle. The thus constructed outer sleeve member 14 is firmly fixed at the outward flanges 58, 62 to the body of the vehicle by means of a plurality of fastening bolts 68 secured to the outward flange 58, 62.

With the outer sleeve member 14 assembled with the integrally vulcanized intermediate product 24, as described above, the upper and lower stopper plates 60, 64 are forcedly pressed onto the elastic projections 30, 40 of the upper and lower elastic protrusions 26, 28, respectively, in the axially inward direction. Therefore, these elastic projections 30, 40 are compressively deformed in the axially inward direction by a given axial distance, due to a pre-load applied thereto in the axially inward direction. On the other hand, the upper and lower stopper plates 60, 64 are spaced apart from the respective protruding end faces 34, 44 of the elastic blocks 32, 42 in the axial direction with a given axial spacing therebetween.

It is noted that the configuration of the inner circumferential surface of the outer sleeve member 14, which is defined by the inner circumferential surfaces of the upper and lower cylindrical members 54, 56, is made substantially similar to the configuration of the outer circumferential surface of the elastic body 16. Further, the inner diameters of the upper and lower cylindrical members 54, 56 are made slightly smaller than that of the outer diameter of the elastic body 16 of the integrally vulcanized product 24, over their entire axial length. In this arrangement, the integrally vulcanized product 24 forcedly pressed into the outer sleeve member 14 is held in pressing contact with the inner circumferential surface of the outer sleeve member 14, and is accordingly firmly fitted onto the inner circumferential surface of the outer sleeve member 14 without bonding therebetween, whereby a radial compressive pre-load is applied to the elastic body 16.

In the present embodiment, particularly, the outer diameter of the elastic body 16 in the integrally vulcanized product 24 is suitably dimensioned, taking into account the sizes of the outer sleeve member 14 and the integrally vulcanized product 24, so that the elastic body 16 exhibits a shear strain of not greater than 1 upon application of a normal driving load within a range of −1000N to 1000N (i.e., a 1000N load both in bound and rebound directions). More specifically, the thickness of the elastic body 16 or a press-fitting amount of the integrally vulcanized product 24 with respect to the outer sleeve member 14 is suitably determined so that the elastic body 16 exhibits a shear strain: $\epsilon$ of not greater than 1 as indicated in the following formula: (2)

$$\text{Shear strain}(\epsilon)=(\sqrt{(B^2+\delta^2)})/b \leq 1 \quad (2)$$

where,
B=radial thickness of the elastic body 16 which is assembled within the outer sleeve member 14 (see FIG. 1)
b=radial thickness of the elastic body 16 which is not assembled within the outer sleeve member 14 (see FIG. 3)
$\delta$=actual amount of axial deformation of the elastic body 16, i.e., axial relative displacement between the inner member 12 and the outer sleeve member 14, upon application of a 1000N load to the upper support 10 in the axial direction.

The shear strain: $\epsilon$ of the elastic body 16 is preferably determined to 0.7 or more, more preferably 0.9 or more, in view of that an excessively small shear strain: $\epsilon$ adversely affects on the vibration damping effect of the upper support 10.

The elastic body 16 is arranged to have an axial length which is equal to or larger than the axial distance between the upper and lower stopper plates 60, 64 of the outer sleeve member 14, so that axially opposite end faces of the elastic body 16 are held in abutting contact with the upper and lower stopper plates 60, 64.

Various known rubber materials such as natural rubber (NR), butadiene rubber (BR), styrene-butadiene rubbers (SBR), may be preferably used for forming the elastic body 16. Preferably, the elastic body 16 is arranged to have a JIS A type (Japanese Industrial Standards) hardness value (Hs) of 50–70.

The upper elastic protrusion 26 that supplementally affects on the shear strain of the elastic body 16 and exhibits a non-linear spring characteristic with respect to the applied load in the bound direction, is also desirably arranged to have an axial compression ratio: c, which satisfies the following formula (3), in order to further reduce the noises generated at the interface formed between the elastic body 16 and the outer sleeve member 14, and in order to reduce or eliminate impact noises generated upon impact of the upper elastic protrusion 26 on the upper stopper plate 60.

$$(c)=|(A-a)|/A \geq 0.15 \quad (3)$$

where,
a=axial length (height) of the upper elastic protrusion 26 protruding from the inner member 12, which is measured when the integrally vulcanized product 24 is not assembled within the outer sleeve member 14 (see FIG. 3)
A=axial length (height) of the upper elastic protrusion 26 protruding from the inner member 12, which is measured when the integrally vulcanized product 24 is assembled within the outer sleeve member 14 (see FIG. 1)

In order to establish an improved durability of the upper elastic protrusion 26, the spring characteristics of the upper elastic protrusion 26 is preferably arranged so as to exhibit an axial compression ratio (c') according to the following formula (4), namely the axial compression ratio of not greater than 0.55, when a 5000N load is applied in the bound direction to the upper support 10:

$$(c')=(|A-a+\gamma|)/A \leq 0.55 \quad (4)$$

where,
$\gamma$=amount of axial relative displacement between the inner member 12 and the outer sleeve member 14 upon application of the 5000N load in the bound direction.

With the thus constructed upper support 10 installed in position with respect to the automotive vehicle, the inner member 12 is axially upwardly displaceable relative to the outer sleeve member 14, upon application of a load in the bound direction. In this case, the elastic projection 30 which is held in pressing contact with the upper stopper plate 60 is initially compressively deformed. When an amount of compressive deformation of the elastic projection 30 exceeds a predetermined amount, the plurality of elastic tiny bosses 38 formed on the protruding end face 34 of the elastic block 32 are brought into abutting contact with, and are forcedly pressed onto the upper stopper plate 60. After these tiny bosses 38 are elastically deformed to be crushed, the protruding end face 34 of the elastic block 32 is brought into abutting contact with and is forcedly pressed onto the upper stopper plate 60, thereby being compressively deformed. When an amount of compressive deformation of the elastic block 32 is relatively small, the elastic block 32 is contact at three surface parts thereof, which are separated apart from one another with the two radial grooves 36 therebetween.

Upon application of a load in the rebound direction to the automotive vehicle, on the other hand, the inner member 12 is axially downwardly displaceable relative to the outer sleeve member 14. In this case, the elastic projection 40 which is held in pressing contact with the lower stopper plate 64 is initially compressively deformed. When an amount of compressive deformation of the elastic projection 40 exceeds a predetermined amount, the plurality of elastic tiny bosses 48 formed on the protruding end face 44 of the elastic block 42 are brought into abutting contact with, and are forcedly pressed onto the lower stopper plate 64. After these tiny bossed 48 are elastically deformed to be crushed, the protruding end face 44 of the elastic block 42 is brought into abutting contact with and is forcedly pressed onto the lower stopper plate 64, thereby being compressively deformed. When an amount of compressive deformation of the elastic block 42 is relatively small, the elastic block 42 is contact at three surface parts thereof which are spaced apart from one another with the two radial grooves 36 therebetween.

Therefore, the upper support 10 constructed according to the present embodiment is capable of exhibiting soft spring characteristics with respect to a relatively small load applied in both of the bound and rebound directions, owing to the compressive deformations of the elastic projections 30, 40 of the upper and lower elastic protrusions 26, 28, which are held in pressing contact with the respective upper and lower stopper plates 60, 64 of the outer sleeve member 14, thereby assuring comfortable driving of the vehicle. Upon application of a relatively large load in both of the bound and rebound directions, on the other hand, the upper support 10 exhibits hard spring characteristics owing to the abutting contact of the upper and lower elastic blocks 32, 42 with the upper and lower stopper plates 60, 64, respectively, thereby establishing an excellent drivability or stability of the vehicle. In particular, the elastic block 32, 42 and the elastic projection 30, 40 are formed substantially independently of each other, whereby the upper support 10 exhibits spring characteristics defined by a non-linear load-deformation elastic curve.

Further, the provision of the plurality of elastic tiny bosses 38, 48 formed on the respective protruding end faces 34, 44 of the elastic blocks 32, 42, and the provision of the radial grooves 36, 46 open in the respective protruding end faces 34, 44 of the elastic blocks 32, 42, make it possible that the upper support 10 exhibits excellent shock absorbing effect by a relatively small axial displacement between the inner member 12 and the outer sleeve member 14, in other words, by a relatively short stroke of the displacement of the inner member 12 relative to the outer sleeve member 14 in the bound or rebound direction. This arrangement is effective to reduce or prevent generation of the impact noise.

In the upper support 10 constructed according to the present embodiment, the outer support member 14 applies the radial compressive force to the elastic body 16 as the radial pre-load. This arrangement permits decrease in an amount of strain or deformation of the elastic body 16 upon application of loads to the upper support 10, and increase of the frictional force generated at an interface formed between the elastic body 16 and the outer sleeve member 14. Accordingly, the relative displacement between the elastic body 16 and the outer sleeve member 14 at the interface formed therebetween is effectively reduced or prevented, thereby preventing generation of unusual sounds or noises caused by sliding or the like between the elastic body 16 and the outer sleeve member 14 at the interfaces therebetween.

In addition, the elastic body 16 is assembled within the outer sleeve member 14 such that the axially opposite end faces of the elastic body 16 are held in abutting contact with the upper and lower stopper plates 60, 64 so that free deformation of the elastic body 16 in the axially outward directions is restricted by the upper and lower stopper plates 60, 64, whereby the radial compressive force by the outer sleeve member 14 is effectively and stably applied to the elastic body 16.

Figure 6:
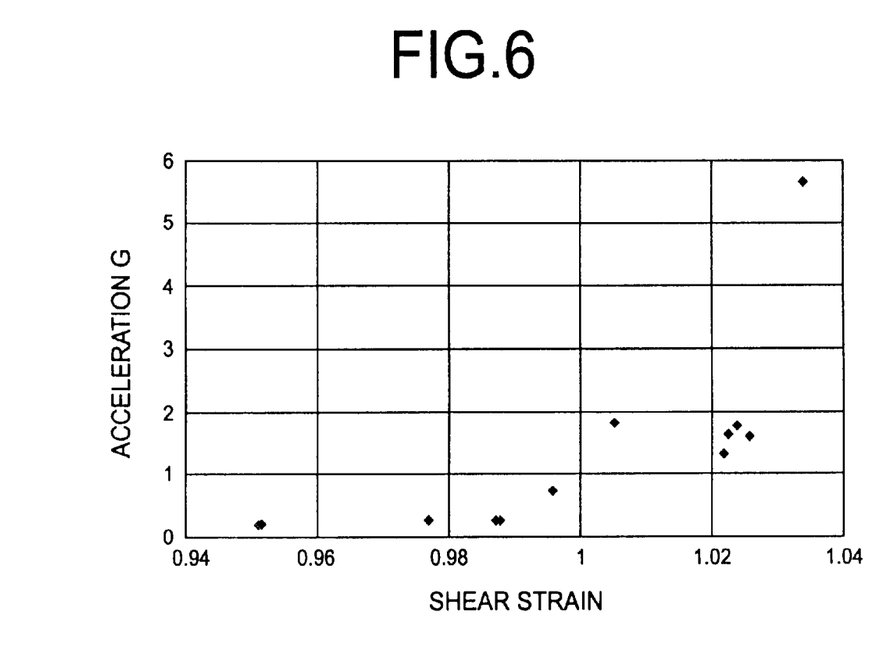
FIG. 6 is a graph representing a relationship between a shear strain of an elastic body of the upper support of FIG. 1 and a generated vibration acceleration G.

Meanwhile, in the upper support 10 constructed according to the present embodiment, the inner member 12 and the outer sleeve member 14 were oscillatory displaced relative to each other in the axial direction, and output values of an acceleration sensor fixed to the outer sleeve member 14 were actually measured. The results of the measurement are indicated in the graph of FIG. 6. As is apparent from the graph of FIG. 6, generation of a vibration acceleration of 1 G or more, which may be recognized as a noise by a human, is effectively prevented by arranging the shear strain of the elastic body 16 to have a value of 1 or lower, in other words, to satisfy the above indicated formula (2): $(\epsilon)=(\sqrt{(B^2+\delta^2)})/b \leq 1$.

While the present invention has been described in detail in its presently preferred embodiment, for illustrative purpose only, it is to be understood that the invention is not limited to the details of the illustrated embodiment.

For instance, the configurations, numbers, dimensions and other features of the elastic tiny bosses 38, 48 and the elastic blocks 32, 42 are not limited to the illustrated embodiment, but may be suitably determined depending upon their required spring characteristics.

The upper and lower grooves 50, 52 are not essential to practice of the present invention. For instance, the upper and lower elastic protrusions 26, 28 and the elastic body 16 may be provided as a substantially integrated form without dividing by means of the upper and lower grooves 50, 52. Further, the size of each of the upper and lower grooves 50, 52 is not particularly limited to the illustrated embodiment. For instance, the upper and lower grooves 50, 52 may be formed with a depth which is made smaller than that in the illustrated embodiment, for example.

According to the illustrated embodiment, the integrally vulcanized product 24 (the elastic body 16) is press-fitted into the outer sleeve member 14, so that the radially compressive load is applied to the elastic body 16 assembled within the outer sleeve member 14. Alternatively, the integrally vulcanized product 24 is disposed radially inwardly of the outer sleeve member 14, and then the outer sleeve member 14 is radially inwardly drawn onto the elastic member 16 of the integrally vulcanized product 24, so that the radially compressive load is applied to the elastic body 16 assembled within the outer sleeve member 14.

Since the lower elastic protrusion 28 is not so much concerned with the problems of durability or noises of the upper support 10, in comparison with the upper elastic protrusion 26, the lower elastic protrusion 28 may be dimensioned with high degree of freedom. However, the lower elastic protrusion 28 is effectively tuned likewise the upper elastic protrusion 26, so that the upper support 10 can exhibit excellent shock absorbing effect upon application of the load in the rebound direction.

It is to be understood that the present invention may be embodied with various other changes, modifications, and improvement which may occur to those skilled in the art, without departing from the spirit and scope of the invention defined in the following claims:

What is claimed is:

1. An upper support for a suspension system, which is interposed between a body of a vehicle and a shock absorber of the vehicle, for elastically supporting the shock absorber with respect to the body independently of a suspension spring of the suspension system, said upper support comprising:

an inner member connectable to a piston rod of the shock absorber;

an outer sleeve member disposed outwardly of the inner member in a radial direction, which is perpendicular to an axial direction of said inner member, with a spacing therebetween, and connectable to the body of the vehicle, said outer sleeve member having a first and a second stop portion formed at respective axially opposite open end portions thereof so as to protrude radially inwardly;

an elastic body interposed between an outer circumferential surface of said inner member and an inner circumferential surface of said outer sleeve member which is opposed to said outer circumferential surface of said inner member in said radial direction, said elastic body being bonded at an inner circumferential surface thereof to said outer circumferential surface of said inner member, while being held in close contact at an outer circumferential surface thereof with said inner circumferential surface of said outer sleeve member, said elastic body being held in abutting contact at axially opposite end faces thereof with said first and second stop portions of said outer sleeve member, respectively; and a first and a second elastic protrusion protruding outwardly from said inner member in opposite axial directions, said first and second elastic protrusions being brought into abutting contact with said first and second stop portions of said outer sleeve member, respectively, wherein said elastic body is compressed by said outer sleeve member in said radial direction, wherein each of said first and second elastic protrusions includes a plurality of elastic projections each protruding axially outwardly from said inner member with a tapered shape, adapted to be held in abutting contact with corresponding one of said first and second stop portions, and a plurality of elastic blocks each interposed between adjacent ones of said elastic projections in a circumferential direction thereof, wherein each of said elastic blocks is substantially independent of said elastic projections and opposing the corresponding one of said first and second stop portions with a spacing therebetween and adapted to come into abutting contact with the corresponding one of said first and second stop portions, and wherein each of said elastic blocks has at least one radially extending groove open in a protruding end face thereof with a depth not larger than a height thereof, and provided with a number of tiny elastic bosses integrally formed on said protruding end face.

2. An upper support according to claim 1, wherein said elastic body exhibits said shear strain of not greater than 1, upon application of an axial load of 1000N between said inner member and said outer sleeve member both in a bound and a rebound direction.

3. An upper support according to claim 2, wherein said shear strain of said elastic body is held within a range of 0.7–1.

4. An upper support according to claim 2, wherein said elastic body has a JIS A type hardness value of 50–70.

5. An upper support according to claim 1, wherein said elastic body is forcedly pressed into said outer sleeve member, whereby said elastic body is compressed by the outer sleeve member in said radial direction.

6. An upper support according to claim 5, wherein said outer circumferential surface of said elastic body and said inner circumferential surface of said outer sleeve member are tapered so as to have respective diameters which decrease in a pressing direction in which said elastic body is pressed into said outer sleeve member.

7. An upper support according to claim 1, wherein said elastic body is subjected to an axial compression force applied to said axially opposite end faces thereof by the outer sleeve member.

8. An upper support according to claim 1, wherein said upper support further comprising: a first annular groove disposed between an abutting portion of said elastic body to said first stop portion and an abutting portion of said first elastic protrusion to said first stop portion, said first annular groove being open to the axially outward direction and continuously extending in the circumferential direction; and a second annular groove disposed between an abutting portion of said elastic body to said second stop portion and an abutting portion of said second elastic protrusion to said second stop portion, said second annular groove being open to said axially outward direction and continuously extending in said circumferential direction, said abutting portions of said elastic body and said first elastic protrusion with respect to said first stop portion being substantially independent of each other by the first groove disposed therebetween, and said abutting portions of said elastic body and said second elastic protrusion with respect to said second stop portion being substantially independent of each other by said second groove disposed therebetween.

9. An upper support for a suspension system, which is interposed between a body of a vehicle and a shock absorber of the vehicle, for elastically supporting the shock absorber with respect to the body independently of a suspension spring of the suspension system, said upper support comprising:

an inner member connectable to a piston rod of the shock absorber;

an outer sleeve member disposed outwardly of the inner member in a radial direction, which is perpendicular to an axial direction of said inner member, with a spacing therebetween, and connectable to the body of the vehicle, said outer sleeve member having a first and a second stop portion formed at respective axially opposite open end portions thereof so as to protrude radially inwardly;

an elastic body interposed between an outer circumferential surface of said inner member and an inner circumferential surface of said outer sleeve member which is opposed to said outer circumferential surface of said inner member in said radial direction, said elastic body being bonded at an inner circumferential surface thereof to said outer circumferential surface of said inner member, while being held in close contact at an outer circumferential surface thereof with said inner circumferential surface of said outer sleeve member, said elastic body being held in abutting contact at axially opposite end faces thereof with said first and second stop portions of said outer sleeve member, respectively;

a first and a second elastic protrusion protruding outwardly from said inner member in opposite axial directions, said first and second elastic protrusions being brought into abutting contact with said first and second stop portions of said outer sleeve member, respectively, wherein said inner member includes an annular connecting portion extending in said radial direction perpendicular to the axial direction thereof, said annular connecting portion being opposed at an outer circumferential surface thereof to said inner circumferential surface of said outer sleeve member in said radial direction, while being opposed at axially opposite first and second end faces thereof to said first and second stop portions thereof, respectively, in said axial direction of the inner member, said first elastic protrusion being disposed between said first stop portion and said first end face of said annular connecting portion, while said second elastic protrusion being disposed between said second stop portion and said second end face of said annular connecting portion; and a first annular groove open to said first stop portion and disposed radially inwardly of said elastic body and radially outwardly of said first elastic protrusion for substantially separating said elastic body and said first elastic protrusion from each other, and a second annular groove open to said second stop portion and disposed radially inwardly of said elastic body and radially outwardly of said second elastic protrusion for substantially separating said elastic body and said second elastic protrusion from each other, wherein said elastic body is compressed by said outer sleeve member in said radial direction, wherein each of said first and second elastic protrusions includes a plurality of elastic projections each protruding axially outwardly from said inner member with a tapered shape, adapted to be held in abutting contact with corresponding one of said first and second stop portions, and a plurality of elastic blocks each interposed between adjacent ones of said elastic projections in a circumferential direction thereof, wherein each of said elastic blocks is substantially independent of said elastic projections and opposing the corresponding one of said first and second stop portions with a spacing therebetween and adapted to come into abutting contact with the corresponding one of said first and second stop portions, and wherein at least one radially extending groove open in a protruding end face thereof with a depth not larger than a height thereof, and provided with a number of tiny elastic bosses integrally formed on said protruding end face.

* * * * *